US012749404B2

(12) United States Patent
Hatsude et al.

(10) Patent No.: US 12,749,404 B2
(45) Date of Patent: Sep. 29, 2026

(54) DRIVE ASSIST APPARATUS

(71) Applicant: TOYOTA JIDOSHA KABUSHIKI KAISHA, Toyota (JP)

(72) Inventors: Yuki Hatsude, Toyota (JP); Takaya Yamashita, Nagoya (JP); Hiroki Shimazu, Nisshin (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 29 days.

(21) Appl. No.: 18/984,474

(22) Filed: Dec. 17, 2024

(65) Prior Publication Data

US 2025/0265932 A1 Aug. 21, 2025

(30) Foreign Application Priority Data

Feb. 16, 2024 (JP) ................................ 2024-022165

(51) Int. Cl.
*G08G 1/16* (2006.01)

(52) U.S. Cl.
CPC ............ *G08G 1/167* (2013.01); *G08G 1/166* (2013.01)

(58) Field of Classification Search
None
See application file for complete search history.

(56) References Cited

U.S. PATENT DOCUMENTS 6,133,825 A * 10/2000 Matsuoka ............. B60Q 9/008 340/436
9,969,261 B2 5/2018 Kodama
10,045,173 B1 8/2018 Morimura et al.
10,106,157 B2 10/2018 Sawada et al.
10,150,407 B2 12/2018 Takahashi et al.
10,696,297 B2 6/2020 Nguyen Van et al.
11,001,255 B2 5/2021 Fukuman et al.
11,110,937 B2 9/2021 Kinoshita et al.
12,420,780 B2 * 9/2025 Zhu ....................... B60W 30/09
2014/0044311 A1 * 2/2014 Takahashi ............. G08G 1/167 382/103
2019/0001968 A1 1/2019 Yorifuji et al.
2019/0019412 A1 * 1/2019 Roca ...................... G08G 1/166
2019/0202476 A1 * 7/2019 Tao ..................... B60W 30/095
2019/0344828 A1 11/2019 Omori et al.
2019/0389488 A1 12/2019 Yamada et al.
2023/0046484 A1 * 2/2023 Fang ...................... B60K 35/22
2023/0415734 A1 * 12/2023 Zhu ....................... G01S 13/931
(Continued)

FOREIGN PATENT DOCUMENTS

CN 103503045 A * 1/2014 ............. G08G 1/166
CN 106809160 B * 8/2018 ........... B60R 21/013
CN 116605136 A * 8/2023 ........... B60Q 9/0008
(Continued)

*Primary Examiner* — Shelley Chen
(74) *Attorney, Agent, or Firm* — Hunton Andrews Kurth LLP

(57) ABSTRACT

A drive assist apparatus for a vehicle is configured to issue a primary warning when a predetermined target present around the ego vehicle enters an assist area set around the ego vehicle, issue a secondary warning when a direction indicator of the ego vehicle is operated while the primary warning is being issued, and change the content of the secondary warning depending on whether or not the ego lane and the adjacent lane in the direction indicated by the direction indicator are in traffic congestion.

4 Claims, 3 Drawing Sheets

(56) References Cited

U.S. PATENT DOCUMENTS

| | | | | |
|---|---|---|---|---|
| 2023/0415811 | A1 * | 12/2023 | Okazaki | B62D 6/001 |

FOREIGN PATENT DOCUMENTS

| | | | | | |
|---|---|---|---|---|---|
| DE | 102021122595 | A1 | * | 3/2022 | B60W 50/14 |
| JP | 2008129974 | A | | 6/2008 | |
| JP | 2009294717 | A | * | 12/2009 | |
| JP | 2022129190 | A | * | 9/2022 | |
| WO | 2012172591 | A1 | | 12/2012 | |

* cited by examiner

DRIVE ASSIST APPARATUS

CROSS-REFERENCE TO RELATED APPLICATION

This application claims priority to Japanese Patent Application No. 2024-022165 filed on Feb. 16, 2024, incorporated herein by reference in its entirety.

BACKGROUND

1. Technical Field

The present disclosure relates to a drive assist apparatus.

2. Description of Related Art

WO2012/172591 discloses a blind spot monitor device that issues a notification of the presence of another vehicle in a region diagonally behind the ego vehicle.

SUMMARY

In a case where the ego lane and an adjacent lane are in traffic congestion, a driver is highly likely to recognize, when changing lanes to the adjacent lane and cutting in between another vehicle traveling diagonally ahead and another vehicle traveling diagonally behind in the adjacent lane, the other vehicle diagonally behind. In addition, the ego vehicle and the other vehicles in the adjacent lane are both traveling at slow speed because of traffic congestion. Thus, the risk of contact at the time of cutting in is also low.

The conventional blind spot monitor device may therefore issue an unnecessary warning that the driver feels annoying when the driver changes lanes to the adjacent lane in a case where the ego lane and the adjacent lane are in traffic congestion.

The present disclosure has been devised in view of such a problem. An object of the present disclosure is to prevent a warning unnecessary for a driver from being issued.

To solve the problem, a drive assist apparatus for a vehicle according to an aspect of the present disclosure is configured to issue a primary warning when a predetermined target present around the vehicle enters an assist area set around the vehicle, issue a secondary warning when a direction indicator of the vehicle is operated while the primary warning is being issued, and change the content of the secondary warning depending on whether or not the ego lane and the adjacent lane in the direction indicated by the direction indicator are in traffic congestion.

In addition, a drive assist apparatus for a vehicle according to an aspect of the present disclosure is configured to issue a primary warning when a predetermined target present around the vehicle enters an assist area set around the vehicle, and issue a secondary warning different from the primary warning when the ego lane and the adjacent lane in the direction indicated by a direction indicator of the vehicle are not in traffic congestion, and continue the primary warning when the ego lane and the adjacent lane in the direction indicated by the direction indicator are in traffic congestion in a case where the direction indicator is operated while the primary warning is being issued.

According to the aspects of the present disclosure, in a case where the ego lane and the adjacent lane are in traffic congestion, the content of the secondary warning is changed in comparison with a case where the ego lane and the adjacent lane are not in traffic congestion, or the primary warning is continued. It is therefore possible to prevent a warning unnecessary for a driver from being issued.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, an embodiment of the present disclosure will be described in detail with reference to the drawings. It is to be noted that similar components will be denoted by the same reference signs in the following description.

Figure 1:
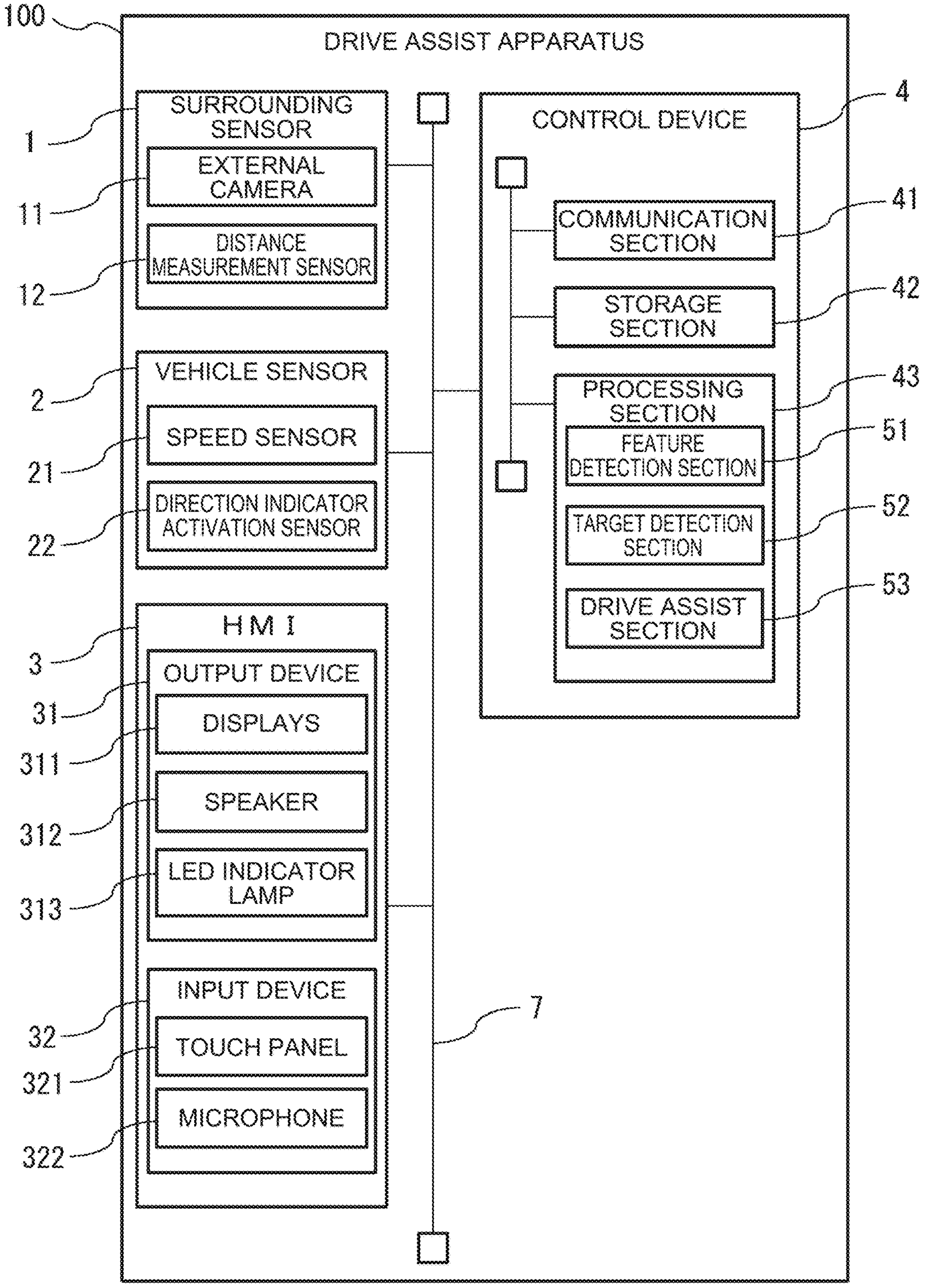
FIG. 1 is a schematic configuration diagram of a drive assist apparatus according to an embodiment of the present disclosure.

FIG. 1 is a schematic configuration diagram of a drive assist apparatus 100 according to the embodiment of the present disclosure.

The drive assist apparatus 100 includes a surrounding sensor 1, a vehicle sensor 2, a human machine interface (HMI) 3, and a control device 4. The surrounding sensor 1, the vehicle sensor 2, the HMI 3, and the control device 4 are connected to each other in a communicable manner via an in-vehicle network 7 compliant with a standard such as a controller area network.

The surrounding sensor 1 is a sensor that generates surrounding data indicating the surrounding situation of a vehicle (referred to as an "ego vehicle" below) to which the drive assist apparatus 100 offers a drive assist. In the present embodiment, one or more external cameras 11 and one or more distance measurement sensors 12 are included as the surrounding sensor 1. The external cameras 11 each image a region around the ego vehicle including the region ahead of the ego vehicle. The distance measurement sensors 12 each measure the distances to various targets such as another vehicle, a pedestrian, and a building present around the ego vehicle.

Each of the external cameras 11 images a region around the ego vehicle at a predetermined frame rate (e.g., 10 [Hz] to 40 [Hz]) and generates a surrounding image showing the region around the ego vehicle. Whenever the external camera 11 generates a surrounding image, the external camera 11 transmits the generated surrounding image to the control device 4 as surrounding data.

Each of the distance measurement sensors 12 irradiates the distance measurement regions around the ego vehicle (the front, the sides, and the rear) with pieces of laser light, radio waves, ultrasonic waves, or the like and receives the reflection light of each piece of radiated laser light, or the reflection wave of each radiated radio wave or each radiated ultrasonic wave. The distance measurement sensor 12 then measures the distances to various targets present in the distance measurement regions based on the pieces of received reflection light or the received reflection waves. The distance measurement sensor 12 transmits distance measurement data associated with the distance to each of the targets and the coordinate information about each target to the control device 4 as surrounding data. As an example of the distance measurement sensor 12, for example, a light detection and ranging (LiDAR) that radiates radar light and measures distance based on the reflection light of the radar light, a millimeter wave radar sensor that radiates a radio wave and measures distance based on the reflection wave of the radio wave, and the like are included.

The vehicle sensor 2 is a sensor that generates vehicle data indicating the situation of the ego vehicle. In the present embodiment, a speed sensor 21 that generates speed data indicating the traveling speed of the ego vehicle, a direction indicator activation sensor 22 that generates direction indicator activation data indicating the activation state of a direction indicator (turn signal) of the ego vehicle, and the like are included as the vehicle sensor 2. The vehicle sensor 2 is not, however, limited to the sensors. The vehicle sensor 2 transmits each piece of acquired data to the control device 4 as vehicle data.

The HMI 3 is a user interface that exchanges information between the ego vehicle and an occupant of the ego vehicle. The HMI 3 includes an output device 31 that notifies the vehicle occupant via the body perception (e.g., a sense of vision, a sense of hearing, a sense of touch, and the like) of the vehicle occupant and an input device 32 for the vehicle occupant to perform an input operation and a reply operation. In the present embodiment, displays (e.g., a meter display, a center display, a head-up display, and the like) 311, a speaker 312, and an LED indicator lamp 313 are included as the output device 31 and a touch panel 321 and a microphone 322 are included as the input device 32.

The HMI 3 displays information (e.g., character information or image information) corresponding to a display signal received from the control device 4 on the displays 311 and outputs sound corresponding to an audio signal from the speaker 312. In addition, the HMI 3 transmits data (referred to as "occupant input data" below) input to the panel or aurally input by the vehicle occupant via the input device 32 to the control device 4.

The HMI 3 may be mounted on the ego vehicle in advance or may be a terminal such as a smartphone owned by the vehicle occupant. In the latter case, for example, information may be exchanged between the ego vehicle and the terminal of the vehicle occupant through near-field communication. Alternatively, communication may be performed between the terminal of the vehicle occupant and an external server (not illustrated) and information may be indirectly exchanged between via the server.

The control device 4 is an electronic control unit (ECU) including a communication section 41, a storage section 42, and a processing section 43.

The communication section 41 includes an interface circuit that connects the control device 4 to the in-vehicle network 7. The communication section 41 supplies various kinds of data received from the respective sensors 1, 2, the HMI 3, and the like to the processing section 43. In addition, the communication section 41 outputs various signals output from the processing section 43 to the HMI 3 and the like.

The storage section 42 includes a storage medium such as a hard disk drive (HDD), a solid disk drive (SSD), or a semiconductor memory and stores various computer programs, data, and the like that are used for processing by the processing section 43.

The processing section 43 includes one or more central processing units (CPUs) and peripheral circuits of the CPUs and executes the various computer programs stored in the storage section 42. The processing section 43 is, for example, a processor. The processing section 43 may further include another arithmetic circuit such as a logical operation unit, a numeric operation unit, or a graphic processing unit. The processing section 43 functions as a feature detection section 51, a target detection section 52, and a drive assist section 53 by executing processing in accordance with computer programs and operates as functional sections (modules) that implement predetermined functions. The following description shows that the processing section 43 executes a program that implements each of the functional sections 51 to 53 in a case where processing will be described by using each of the functional sections 51 to 53 as a subject.

The content of specific processing executed by the control device 4 will be described below. That is, the content of each of the functional sections 51 to 53 that is implemented by the processing section 43 executing processing in accordance with a program will be described.

The feature detection section 51 detects a feature based on surrounding data received from the surrounding sensor 1. In the present embodiment, the feature detection section 51 detects the lane lines of the ego lane, an adjacent lane, and the like based on a surrounding image received from the external camera 11. The feature detection section 51 is capable of detecting the lane lines of the ego lane and the like based on the surrounding image received from the external camera 11 by using, for example, an image recognition technique such as edge detection or semantic segmentation. In addition, the feature detection section 51 is also capable of detecting the lane lines of the ego lane and the like, for example, by inputting the surrounding image received from the external camera 11 to a discriminator learned in advance to detect a lane line. The discriminator may be, for example, a convolutional neural network (CNN) including a plurality of convolutional layers that is connected in series from the input side to the output side. Learning is performed by inputting an image including a lane line to the CNN in advance as training data and the CNN hereby operates as a discriminator that detects a lane line. It is to be noted that a method for detecting a feature is not limited to such a method. Features may be detected by various known techniques.

The target detection section 52 detects another vehicle present around the ego vehicle based on surrounding data received from the surrounding sensor 1. The target detection section 52 is capable of detecting the other vehicle present around the ego vehicle, for example, by grouping reflection points that satisfy a predetermined condition among a plurality of reflection points detected by the distance measurement sensor 12 as reflection points of laser light or the like reflected from the same object. The target detection section 52 then calculates the position and the speed of the other detected vehicle by tracking the other vehicle in chronological order. In addition, the target detection section 52 is also capable of detecting another vehicle, for example, by inputting the surrounding image received from the external camera 11 to a discriminator (e.g., CNN) learned in advance to detect another vehicle. It is to be noted that a method for detecting another vehicle is not limited to such a method. Other vehicles may be detected by various known techniques.

In a case where another vehicle recognized by the target detection section 52 enters a drive assist area (see FIG. 2) set in advance around the ego vehicle, the drive assist section 53 issues a primary warning indicating the presence of the other vehicle in the drive assist area via the HMI 3 as a drive assist for a driver. In addition, in a case where a direction indicator of the ego vehicle is operated while the primary warning is being issued, the drive assist section 53 issues a secondary warning via the HMI 3. The secondary warning basically has a higher warning level than the warning level of the primary warning. As the primary warning and the secondary warning, for example, it is possible to issue a warning by turning on or blinking an LED indicator, a warning by making a message, a warning by making sound, a physical warning by vibrating the steering wheel, and the like.

A drive assist by the drive assist section 53 will be described in more detail below with reference to FIG. 2 and FIG. 3.

Figure 2:
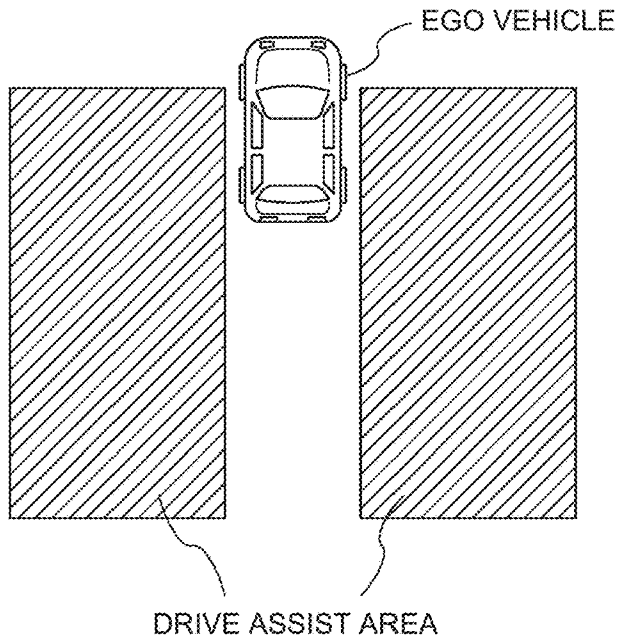
FIG. 2 is a diagram illustrating an example of a drive assist area that is set in advance around an ego vehicle.

FIG. 2 is a diagram illustrating an example of a drive assist area that is set in advance around the ego vehicle. FIG. 3 is a diagram illustrating an example of a scene in which lanes are changed in a case where the ego lane and an adjacent lane are in traffic congestion. It is to be noted that FIG. 3 illustrates only the drive assist area on the right side of the ego vehicle to prevent the diagram from being complicated.

As illustrated in FIG. 2, the drive assist area is supposed to be an area on a side of and behind the ego vehicle. The area on a side of and behind the ego vehicle is difficult for a driver to directly recognize visually.

Figure 3:
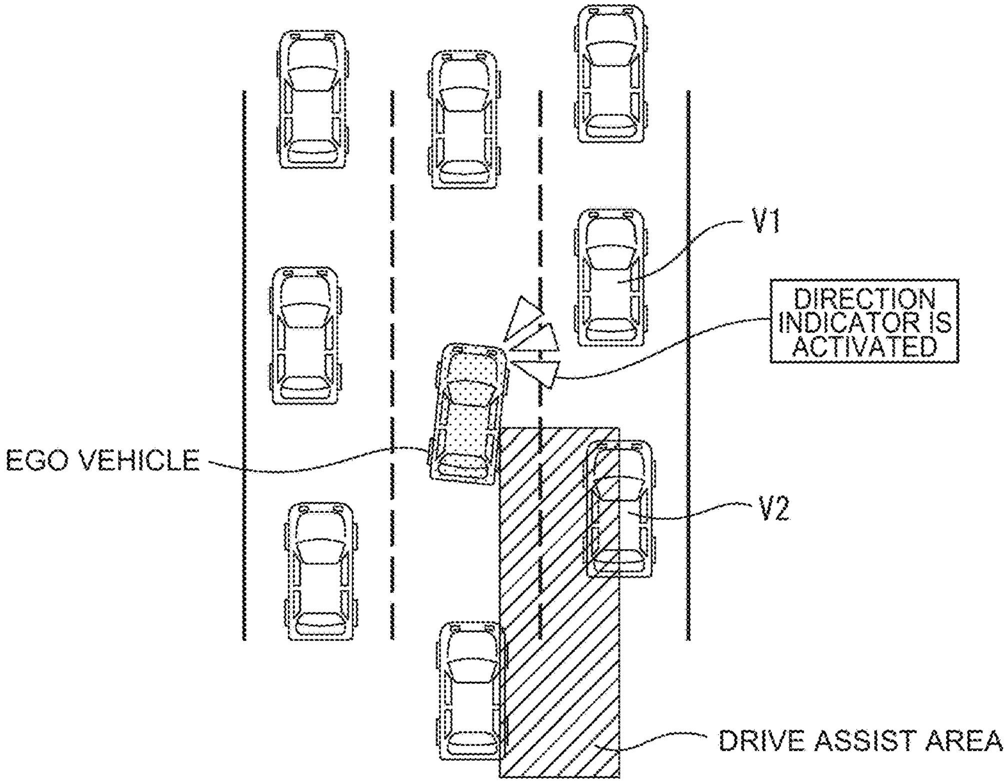
FIG. 3 is a diagram illustrating an example of a scene in which lanes are changed in a case where an ego lane and an adjacent lane are in traffic congestion.

Here, as illustrated in FIG. 3, in a case where the ego lane and an adjacent lane are in traffic congestion, a driver is highly likely to recognize, when changing lanes to the adjacent lane on the right side of the ego lane and cutting in between another vehicle V1 traveling diagonally ahead and another vehicle V2 traveling diagonally behind in the adjacent lane, the other vehicle V2 diagonally behind. In addition, the ego vehicle and the other vehicles V1, V2 in the adjacent lane are both traveling at slow speed because of traffic congestion. Thus, the risk of contact at the time of cutting in is also low.

If a secondary warning having a higher warning level than the warning level of a primary warning is issued in such a situation because a direction indicator is operated, some drivers may feel the secondary warning annoying. Accordingly, in the present embodiment, the content of the secondary warning is changed depending on whether or not the ego lane and an adjacent lane are in traffic congestion.

Figure 4:
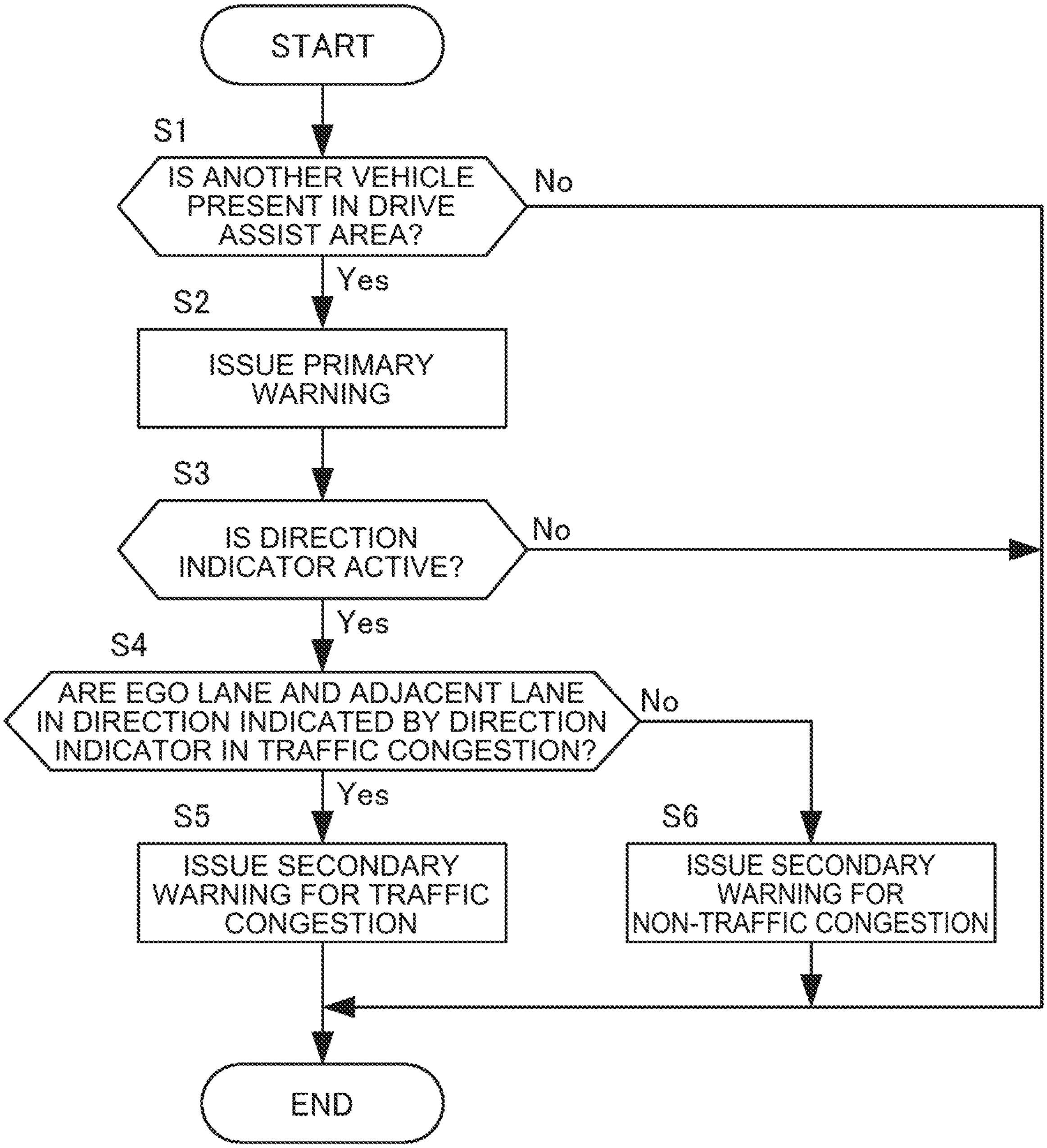
FIG. 4 is a flowchart describing drive assist control according to the embodiment of the present disclosure.

FIG. 4 is a flowchart describing drive assist control according to the present embodiment that is executed by the drive assist section 53 and further the control device 4. The control device 4 repeatedly executes the present routine in a predetermined calculation cycle $\Delta T$.

In step S1, the control device 4 determines whether or not another vehicle is present in a drive assist area. If another vehicle is present in the drive assist area, the control device 4 proceeds to the processing of step S2. In contrast, if no other vehicle is present in the drive assist area, the control device 4 ends the current processing.

In step S2, the control device 4 issues a primary warning. In the present embodiment, the control device 4 turns on the LED indicator lamp 313 as the primary warning. It is to be noted that the installation position of the LED indicator lamp 313 is not limited in particular as long as the installation position is a position visually recognizable to a driver. In the present embodiment, the LED indicator lamp 313 is provided onto the mirror surface side of an outer rear-view mirror (also referred to as a side mirror or a door mirror).

In step S3, the control device 4 determines based on direction indicator activation data whether or not a direction indicator is active. If the direction indicator is active, the control device 4 proceeds to the processing of step S4. In contrast, if the direction indicator is not active, the control device 4 ends the current processing.

In step S4, the control device 4 determines whether or not the ego lane and the adjacent lane in the direction indicated by the direction indicator are in traffic congestion. In the present embodiment, if the traveling speed of the ego vehicle is traveling speed within a predetermined slow-speed range, other vehicles the traveling speed of each of which is within the slow-speed range are present ahead and behind in the ego lane, and other vehicles the traveling speed of each of which is within the slow-speed range are present ahead and behind in the adjacent lane in the direction indicated by the direction indicator, the control device 4 determines that the ego lane and the adjacent lane in the direction indicated by the direction indicator are in traffic congestion. In the present embodiment, the slow-speed range is a speed range of 5 [km/h] to 10 [km/h], but is not limited to such a speed range. The slow-speed range may be set as appropriate.

If the ego lane and the adjacent lane in the direction indicated by the direction indicator are in traffic congestion, the control device 4 proceeds to the processing of step S5. In contrast, if the ego lane and the adjacent lane in the direction indicated by the direction indicator are not in traffic congestion, the control device 4 proceeds to the processing of step S6.

In step S5, the control device 4 issues a secondary warning for traffic congestion. The secondary warning for traffic congestion according to the present embodiment is set as a warning that has a higher warning level than the warning level of the primary warning, but has a lower warning level than the warning level of a secondary warning for non-traffic congestion described below. In the present embodiment, the control device 4 blinks the LED indicator lamp turned on in the primary warning as the secondary warning for traffic congestion.

However, in another embodiment, the secondary warning for traffic congestion may be set at a warning level equal to the warning level of the primary warning. That is, when the ego lane and the adjacent lane in the direction indicated by the direction indicator are in traffic congestion, the primary warning may be continued.

In step S6, the control device 4 issues a secondary warning for non-traffic congestion. The secondary warning for non-traffic congestion may be set as a warning having a higher warning level than the warning levels of the primary warning and the secondary warning for traffic congestion. In the present embodiment, the control device 4 issues an alert by making sound (e.g., such as emitting a beep) as the secondary warning for non-traffic congestion in addition to blinking the LED indicator lamp turned on in the primary warning. Needless to say, a physical alert or the like may be issued by vibrating the steering wheel instead of or along with the alert issued by making sound.

The drive assist apparatus 100 for a vehicle according to the present embodiment described above is configured to issue a primary warning when a predetermined target present around the ego vehicle enters a drive assist area set around the ego vehicle, issue a secondary warning when a direction indicator of the ego vehicle is operated while the primary warning is being issued, and change the content of the secondary warning depending on whether or not the ego lane and the adjacent lane in the direction indicated by the direction indicator are in traffic congestion.

It is hereby possible to issue a secondary warning suitable for traffic congestion at the time of traffic congestion and issue a secondary warning suitable for non-traffic congestion at the time of non-traffic congestion. It is thus possible to prevent a driver from feeling the secondary warning annoying. That is, it is possible to prevent an unnecessary warning that the driver feels annoying from being issued.

Specifically, in the present embodiment, the drive assist apparatus 100 is configured to decrease the warning level of the secondary warning when the ego lane and the adjacent lane in the direction indicated by the direction indicator are in traffic congestion in comparison with the warning level of the secondary warning that is issued when the ego lane and the adjacent lane in the direction indicated by the direction indicator are not in traffic congestion. The secondary warning for traffic congestion that is issued when the ego lane and the adjacent lane in the direction indicated by the direction indicator are in traffic congestion is then a warning having a higher warning level than the warning level of the primary warning.

It is therefore possible to warn the driver about the presence of another vehicle in a drive assist area in a primary warning and prevent an excessive warning from being issued as a secondary warning when lanes are changed at the time of traffic congestion. In addition, when lanes are changed, it is possible to issue a secondary warning having a higher warning level than the warning level of a primary warning. It is thus possible to reduce a collision risk brought about by changing lanes.

In addition, in another embodiment, the drive assist apparatus 100 is configured to issue a warning similar to the primary warning as the secondary warning when the ego lane and the adjacent lane in the direction indicated by the direction indicator are in traffic congestion, and issue a warning having a higher warning level than the warning level of the primary warning as the secondary warning when the ego lane and the adjacent lane in the direction indicated by the direction indicator are not in traffic congestion. In other words, the drive assist apparatus 100 is configured to issue a primary warning when a predetermined target present around the ego vehicle enters an assist area set around the ego vehicle, and issue a secondary warning different from the primary warning when the ego lane and the adjacent lane in the direction indicated by a direction indicator of the ego vehicle are not in traffic congestion, and continue the primary warning when the ego lane and the adjacent lane in the direction indicated by the direction indicator are in traffic congestion in a case where the direction indicator is operated while the primary warning is being issued.

Such a configuration makes it possible to issue a secondary warning having a higher warning level than the warning level of a primary warning to reduce a collision risk brought about by changing lanes at the time of non-traffic congestion, and continue the primary warning at the time of traffic congestion. It is thus possible to prevent a driver from feeling the secondary warning annoying. That is, it is possible to prevent an unnecessary warning that the driver feels annoying from being issued.

The embodiment of the present disclosure has been described so far, but the embodiment exhibits merely some of application examples of the present disclosure. The embodiment of the present disclosure does not intend to limit the technical scope of the present disclosure to the specific configuration according to the embodiment.

For example. in the embodiment, a computer program that is executed by the control device 4 may be provided as recorded in a computer-readable portable recording medium such as a semiconductor memory, a magnetic recording medium, or an optical recording medium.

What is claimed is:

1. A drive assist apparatus for a vehicle, the drive assist apparatus being configured to issue a primary warning when a predetermined target present around the vehicle enters an assist area set around the vehicle, issue a secondary warning when a direction indicator of the vehicle is operated while the primary warning is being issued, and change content of the secondary warning depending on whether or not an ego lane and an adjacent lane in a direction indicated by the direction indicator are in traffic congestion.

2. The drive assist apparatus according to claim 1, wherein the drive assist apparatus is configured to decrease a warning level of the secondary warning when the ego lane and the adjacent lane in the direction indicated by the direction indicator are in traffic congestion in comparison with a warning level of the secondary warning that is issued when the ego lane and the adjacent lane in the direction indicated by the direction indicator are not in traffic congestion.

3. The drive assist apparatus according to claim 2, wherein the secondary warning that is issued when the ego lane and the adjacent lane in the direction indicated by the direction indicator are in traffic congestion is a warning having a higher warning level than a warning level of the primary warning.

4. The drive assist apparatus according to claim 1, wherein the drive assist apparatus is configured to issue a warning similar to the primary warning as the secondary warning when the ego lane and the adjacent lane in the direction indicated by the direction indicator are in traffic congestion, and issue a warning having a higher warning level than a warning level of the primary warning as the secondary warning when the ego lane and the adjacent lane in the direction indicated by the direction indicator are not in traffic congestion.

* * * * *